Sept. 9, 1952           J. B. HORVAY           2,609,835

ADJUSTABLE MAGNETIC PRESSURE VALVE

Filed Dec. 27, 1948

Inventor:
Julius B. Horvay,
by Abraham Cohen
His Attorney.

Patented Sept. 9, 1952

2,609,835

UNITED STATES PATENT OFFICE 2,609,835

ADJUSTABLE MAGNETIC PRESSURE VALVE

Julius B. Horvay, Schenectady, N. Y., assignor to General Electric Company, a corporation of New York Application December 27, 1948, Serial No. 67,327

5 Claims. (Cl. 137—528)

The present invention relates to magnetic pressure valves. It is particularly concerned with improved magnetic pressure valves of simple construction including reliable and efficient means for adjusting the valve for operation at a predetermined pressure.

Briefly described, the valve of the present invention comprises a magnetic circuit including a permanent magnet and a valve assembly in which portions of the valve seat on opposite sides of the valve aperture and the valve closure member are of magnetic material. The valve seat, in slidable engagement with the poles of the magnet, is rotatable with regard thereto so that the magnetic portions thereof can be moved from a position in which they bridge the poles of the magnet to a non-bridging position in which the portions respectively overlie the opposite pole face of the magnet. In the bridging position, the flux density through the closure member is at a minimum so that it can be displaced from its seated position in the valve aperture by a minimum pressure while in the non-bridging position, the flux density through the closure member is at a maximum and the pressure required to open the valve is likewise high. To increase the accuracy of the valve, the walls of the valve aperture and the area surrounding the aperture are preferably coated with a thin layer of non-magnetic material. As a result, the differential between the pressure required to open the valve and the pressure at which the valve closes is reduced to a minimum.

Figure 1:
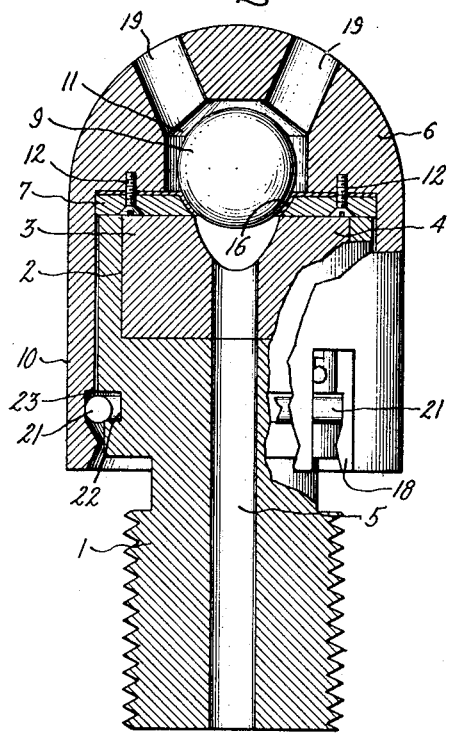
Figure 2:
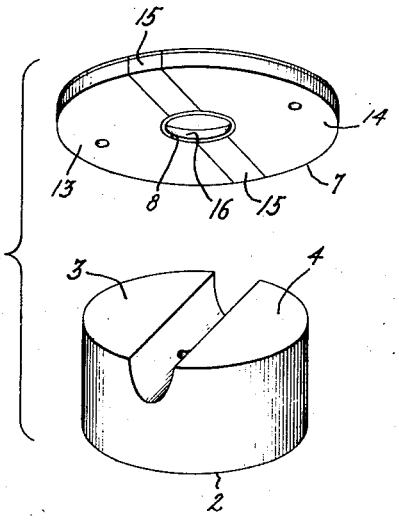
Figure 3:
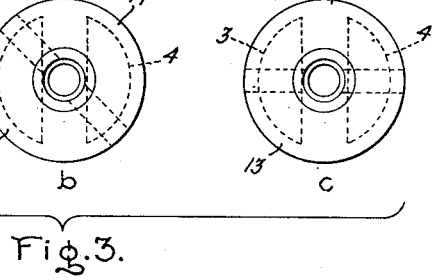

For a more complete description of the present invention, reference is made to the accompanying drawing in which Fig. 1 is a vertical view partially in section illustrating a valve structure embodying the principles of the present invention; Fig. 2 is an expanded perspective view of certain of the elements of the valve of Fig. 1; and Fig. 3 is a view illustrating somewhat diagrammatically the relative positions of certain elements of the valve under different operating pressures.

While the valve of the present invention can be employed in any pressure-relief application, the invention is particularly useful in its application to a pressure valve for pressure cookers and the like.

In the drawing and with particular reference to Fig. 1, there is shown a pressure valve designed primarily for use with home pressure cookers comprising a generally cylindrical valve body 1 of non-magnetic material, such as brass, having a cylindrical permanent magnet 2, such as an alnico magnet of U-shaped cross section embedded in the upper end thereof with the poles 3 and 4 of the magnet comprising part of the horizontal plane top surface of the member 1. The lower end of the valve body 1 is threaded for connection to a pressure chamber, as for example, the lid of a pressure cooker so that the lower or inlet end of the vertical passageway 5 will communicate with the interior of the vessel. In the illustrated valve, the passageway extends vertically through the valve body with the outlet end thereof between the poles 3 and 4 of the magnet.

The valve mechanism proper is arranged within the valve cap 6 and comprises a valve seat 7 having an aperture 8 and a closure member 9 which is illustrated as being in the form of a ball of high permeability magnetic material, such as steel. The body of the valve cap 6 is a generally inverted cup-shaped member of non-magnetic material with the depending walls 10 thereof adapted to encompass the upper end of the valve body 1 when the cap is positioned thereon.

A recess 11 is provided in the bottom of the cap 10 for receiving ball 9. This recess is of a size sufficient to allow the ball some freedom of movement therein and the ball is loosely retained in the recess by means of the disc-shaped valve seat 7 secured to the bottom of the cap by suitable means, such as screws 12. Alternatively, the seat may be press fitted into valve cap 6. When the cap is placed over the end of valve body 1, the lower surface of valve seat 7 is in direct and complete engagement with the upper surface of the valve body with the valve aperture 8 in communication with passageway 5.

The valve seat 7, as shown in Fig. 2, includes two sections of magnetic material 13 and 14 on opposite sides of the valve aperture joined by strips 15 of non-magnetic material terminating at their inner ends in the walls of the valve aperture. With the cap arranged on the valve body in the position shown in Fig. 1 with the magnetizable sections 13 and 14 respectively overlying, the poles 3 and 4 of the magnet, the strips 15, and the aperture 8 form a working gap in the magnetic circuit including the permanent magnet 2 and sections 13 and 14. The closure member 9 is ordinarily attracted into valve-closing position in aperture 8 by a force depending primarily on the flux density of the magnetic circuit passing through the member 9. So long as this force is greater than the pressure within aperture 5, the ball will remain seated in the aperture 8. However, when the pressure in aperture 5 exceeds the magnetic attraction on the ball closure member, the ball will be pushed upwardly and will remain in the valve-open position with the air, steam or other fluid passing through the valve escaping through one or more vents 19 provided in cap 6 and communicating with the recess 11. At such time as the excess pressure is relieved, the closure member 9 will again be attracted to the valve-closing position.

The cap 6 may be retained on valve body 5 by means of a split retaining spring 21 mounted in annular circumferential groove 22 in the valve body and adapted to engage a cooperating groove 23 extending around the inner surface of the cap side wall 10 when the cap is placed on the body.

In a preferred form of the valve of the present invention, the upper surface portions of the valve seat, particularly the portions thereof contacted by the closure member 9, such as the walls of aperture 8, are coated with a thin layer 16 of non-magnetic material to space the seated magnetic closure member from the magnetic portions of the valve seat. Such a coating, which may be of a thickness of the order of 0.05 inch, generally increases the accuracy of the valve by functioning as an air gap which decreases the difference between the magnetic pull on the closure member in the seated position and the pull thereon in the raised position. The provision of a non-magnetic shim or coating on the walls of the valve aperture assures a minimum differential between the pressure required to open the valve and the pressure at which the valve will close. In addition, the presence of the non-magnetic layer also minimizes the relative spacing effect of any condensate which may collect on the aperture walls or the closure member during use of the valve in the presence of water vapor or other condensable or liquid media.

For many applications as, for example, in the use of pressure relief valves on pressure cookers for home use, it is desirable that the valve be adjustable to operate at any one of a plurality of pressures. Due to the design of the valve of the present invention, it may be readily adjusted to open at any pressure between a maximum pressure corresponding to the magnetic pull on ball 9 when the magnetic portions of seat 7 are in non-bridging relationship to the poles of the permanent magnet 2 and a minimum pressure corresponding to the pull on the ball when the magnetic portions 13 and 14 are in their maximum bridging relationship to poles 3 and 4. The adjustment is accomplished merely by rotating cap 6 relative to the valve body 1.

The adjustment feature is best understood by reference to Fig. 3 in which views a, b and c illustrate the relative positions of the valve seat and magnet for maximum, intermediate and minimum valve operating pressures. In Fig. 3a, the magnetic sections 13 and 14 respectively overlie poles 3 and 4 so that the flux density through the closure member 9 is at its maximum for any given valve structure. On rotation of the cap in either direction, the magnetic sections 13 and 14 are first brought into a partial bridging position, such as that illustrated in Fig. 3b, where part of the magnetic flux passes through the bridging portions of sections 13 and 14 with a resultant decrease in the flux density through the closure member and a corresponding decreases in the magnetic pull thereon. As the cap is rotated further to the position illustrated in Fig. 3c, there is a further increase in the flux carried by the sections 13 and 14 due to the fact that the area of these sections bridging the poles is greater than that in the position illustrated in Fig. 3b. In this position, the valve is adjusted to operate at the lowest pressure.

Suitable indicia may be placed on the external portions of the cap and valve body for indicating the operating pressure of the valve for any given cap position. In the illustrated embodiment of the invention, the indicating means comprises a slot 18 in the lower edge of the walls 10 of the valve cap and suitable indicia, such as numerals, giving the operating pressure in pounds per square inch printed or otherwise affixed on the wall of the valve body 10 designating the operating pressure of the valve when that particular numeral is exposed by the slot 18.

What I claim as new and desire to secure by Letters Patent of the United States is:

1. A magnetic pressure valve comprising a body portion having a passage therein, an apertured valve seat including two magnetic sections on opposite sides of the aperture, the outlet end of said aperture communicating with said passage, said sections being joined by strips of non-magnetic material, a magnetic closure member adapted to seat in and close said aperture, a permanent magnet arranged within the body portion of said valve below said valve seat with the poles thereof in contact with the magnetic sections of said seat for attracting said closure member into the seated position in said aperture, the opposite pole pieces of said magnet being on opposite sides of said passage, said valve seat being movable with regard to said magnet between a position in which each of the magnetic portions of said seat respectively overlies a pole of the magnet and a position in which they bridge said poles to vary the magnetic pull of the magnet on said closure member.

2. A pressure valve comprising a valve body including a permanent magnet of U-shaped cross section with the poles thereof terminating in a plane surface forming the outlet end of said valve body, a passageway in said body with the outlet end thereof between the poles of said magnet, a valve cap, an apertured disc-shaped valve seat attached to said cap and forming the bottom thereof, said seat having a flat bottom surface engaging the plane surface of the valve body including the poles of said magnet, a recess in said cap above the aperture in said seat, an outlet vent in said cap communicating with said recess, a magnetic ball within said recess, said ball being adapted to seat in said aperture, said valve seat comprising two magnetic portions on opposite sides of said aperture, said magnetic portions forming part of a magnetic circuit including the magnetic ball and the permanent magnet, said seat being arranged for rotation between a position in which each of the magnetic portions thereof respectively overlies a pole of the magnet and a position in which they bridge said poles.

3. A magnetic valve comprising a valve body including a permanent magnet of U-shaped cross section with the pole faces comprising the plane upper surface of said body, a passageway within said body with the outlet end thereof terminating in said plane surface, a valve cap including a non-magnetic inverted cup-shaped portion having a recess in the bottom thereof and a vent communicating with said recess, a disc-shaped apertured valve seat attached to said cap, a magnetic ball valve arranged within said recess and retained therein in seating relationship with the valve seat aperture by means of said valve seat, said valve seat including two separate magnetic portions on opposite sides of said aperture, said seat slidably engaging the pole faces of said magnet with the valve aperture communicating with the outlet end of said passageway, a thin coating of non-magnetic material on the walls defining the valve aperture, the magnetic portions of said valve seat being of a shape such that in one position of said seat said portions are in bridging relationship with regard to the poles of said magnet and in a second position of said seat are in a non-bridging relationship.

4. A magnetic valve comprising an inlet and an outlet, an apertured valve seat between said inlet and outlet and including two magnetically insulated magnetic portions on opposite sides of the valve seat aperture, a permanent magnet having opposite poles on opposite sides of said aperture, a magnetic ball adapted to seat in said aperture on the outlet side of said valve seat, said magnet, valve seat and ball forming a magnetic circuit wherein the flux flowing through said ball can be varied by rotation of the valve seat relative to the poles of said magnet between a position in which each of said magnetic portions overlies a pole of the magnet and a position in which they bridge said poles.

5. An adjustable pressure valve comprising a member having a vertically extending passageway therein and including a U-shaped permanent magnet adjacent the top thereof with the poles of said magnet on opposite sides of the upper outlet end of said passageway, said member having a horizontal plane top surface including the pole faces of said magnet, a generally inverted cup-shaped valve member rotatably mounted on said first member with the side walls extending downwardly along the outer wall of said first member, said valve member having a recess in the bottom thereof, a magnetic ball loosely retained in said recess and a disc-shaped apertured valve seat integral with said valve member and serving to retain said ball in said recess with the aperture in said valve seat in line with said recess and communicating with the upper outlet end of said passageway, said ball being adapted to be held in said aperture in closing relationship by said magnet, an outlet adjacent the top of said valve member communicating with said recess, said valve seat having a plane bottom surface engaging the top surface of said first member and comprising two magnetic portions on opposite sides of the aperture joined by strips of non-magnetic material of a width less than the diameter of said aperture, said magnetic portions, magnetic ball and magnet forming a magnetic circuit, said valve member including said valve seat being rotatable about the vertical axis passing through said aperture to move the magnetic portions of said valve seat from non-bridging to bridging relationship with the poles of said magnet thereby to vary the relative amount of flux passing through said ball.

JULIUS B. HORVAY.

REFERENCES CITED

The following references are of record in the file of this patent:

UNITED STATES PATENTS

| Number | Name | Date |
|---|---|---|
| 142,486 | Little | Sept. 2, 1873 |
| 912,576 | Kelley | Feb. 16, 1909 |
| 1,117,399 | Kibele | Nov. 17, 1914 |

FOREIGN PATENTS

| Number | Country | Date |
|---|---|---|
| 472,426 | Great Britain | Sept. 23, 1937 |